(12) United States Patent
Nonaka

(10) Patent No.: US 8,478,727 B2
(45) Date of Patent: *Jul. 2, 2013

(54) STORAGE SYSTEM AND CONTROL METHOD FOR THE SAME

(75) Inventor: Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/507,211

(22) Filed: Jun. 13, 2012

(65) Prior Publication Data

US 2012/0324185 A1    Dec. 20, 2012

Related U.S. Application Data

(63) Continuation of application No. 12/311,519, filed on Apr. 2, 2009, now Pat. No. 8,229,894.

(51) Int. Cl.
*G06F 7/00* (2006.01)
*G06F 17/00* (2006.01)

(52) U.S. Cl.
USPC ........................................................ 707/649

(58) Field of Classification Search
USPC ........................................................ 707/649
See application file for complete search history.

(56) References Cited

U.S. PATENT DOCUMENTS

| | | | |
|---|---|---|---|
| 5,649,152 A * | 7/1997 | Ohran et al. .................. | 711/114 |
| 6,182,198 B1 * | 1/2001 | Hubis et al. .................. | 711/162 |
| 6,205,449 B1 | 3/2001 | Rastogi et al. | |
| 7,174,352 B2 * | 2/2007 | Kleiman et al. ............... | 1/1 |
| 7,197,665 B2 * | 3/2007 | Goldstein et al. ............. | 714/20 |
| 7,565,501 B2 * | 7/2009 | Mogi et al. .................... | 711/162 |
| 7,802,134 B1 * | 9/2010 | Sobel et al. ................... | 714/15 |
| 2007/0168629 A1 * | 7/2007 | Mogi et al. .................... | 711/162 |

(Continued)

FOREIGN PATENT DOCUMENTS

| | | |
|---|---|---|
| JP | 11-327991 | 11/1999 |
| JP | 2005-038176 | 2/2005 |
| JP | 2007-199920 | 8/2007 |
| JP | 2007-334709 | 12/2007 |

OTHER PUBLICATIONS

International Search Report issued in corresponding International Application No. PCT/JP2009/053776, mailed Nov. 23, 2009.
Office Action form the Japanese Patent Office, issued in the corresponding Japanese Patent Application No. 2011-530651, dated Dec. 11, 2012, pp. 1-2.

*Primary Examiner* — Tony Mahmoudi
*Assistant Examiner* — Muluemebet Gurmu
(74) *Attorney, Agent, or Firm* — Stites & Harbison PLLC; Juan Carlos A. Marquez, Esq.; Nicholas B. Trenkle, Esq.

(57) ABSTRACT

When updating the data in each generation's logical units, the snapshot processing unit writes the update data in accordance with the update as forward differential data 221 to the base volume, and saves the old data that existed in the base volume before that update data was written as backward differential data in the backward differential data pool, and, when each generation's logical unit backward differential data is updated, deletes the forward differential data belonging the production LUs and the snapshots that together with those production LUs form the forward differential group. As a result of this, the amount of metadata necessary for executing a host command is able to be reduced in production LUs utilizing snapshots using the forward differential method.

8 Claims, 21 Drawing Sheets

U.S. PATENT DOCUMENTS

| | | |
|---|---|---|
| 2007/0174567 A1 | 7/2007 | Deguchi et al. |
| 2007/0294495 A1 | 12/2007 | Uchida et al. |
| 2008/0140963 A1* | 6/2008 | Thomason et al. ........... 711/162 |
| 2010/0058010 A1* | 3/2010 | Augenstein et al. .......... 711/162 |

* cited by examiner

FIG.6

| LUN | CLASSIFICATION | CAPACITY | BASE VOLUME STRUCTURE | GENERATION NUMBER | CORRESPONDING PRODUCTION LU | DIFFERENCE MANAGEMENT METHOD | POOL ID FORWARD/ BACKWARD | DIFFERENCE CONVERSION POLICY / DIFFERENCE CAPACITY THRESHOLD |
|---|---|---|---|---|---|---|---|---|
| 0 | PRODUCTION | 500GB | RAID5, ... | - | - | FORWARD | 0/1 | - |
| 1 | SNAPSHOT | - | - | 1 | 0 | BACKWARD | - | - |
| 2 | SNAPSHOT | - | - | 2 | 0 | BACKWARD | - | - |
| 3 | SNAPSHOT | - | - | 3 | 0 | FORWARD | - | - |
| 4 | PRODUCTION | 300GB | RAID6, ... | - | - | FORWARD | 2/3 | REGULAR EXECUTION |
| 5 | SNAPSHOT | - | - | 1 | 0 | BACKWARD | - | - |
| 6 | SNAPSHOT | - | - | 2 | - | BACKWARD | - | - |
| 7 | PRODUCTION | 400GB | RAID5, ... | - | - | BACKWARD | -/5 | NO CONVERSION |
| 8 | SNAPSHOT | - | - | 1 | 0 | BACKWARD | - | - |

| POOL ID | VOLUME STRUCTURE | DIFFERENCE MANAGEMENT METHOD | DIFFERENCE CAPACITY COUNTER |
|---|---|---|---|
| 0 | RAID5, ... | FORWARD | 41280740 |
| 1 | RAID5, ... | BACKWARD | 55790428 |
| 2 | RAID6, ... | FORWARD | 25712509 |
| : | | | |

| | 912 | |
|---|---|---|
| 102 | | 1101 |
| DIFFERENCE LIST 1 | | FREE LIST POINTER |
| DIFFERENCE LIST 2 | | FREE LIST POINTER |
| ⋮ | | ⋮ |
| DIFFERENCE LIST n | | FREE LIST POINTER |

102B

| 1102 | 1103 | 1104 | 1105 |
|---|---|---|---|
| START LBA | Length | Extent ID | Offset |
| 0100h | 80h | 1 | 0 |
| 0380h | 40h | 2 | 0 |
| 0400h | 10h | 3 | 0 |
| 1520h | 20h | 4 | 0 |

| Extent ID | POOL INTERNAL START LBA | Length | REFERENCE COUNTER |
|---|---|---|---|
| 1 | 0000h | 80h | 1 |
| 2 | 0080h | 40h | 1 |
| 3 | 00C0h | 10h | 1 |
| 4 | 00E0h | 20h | 1 |
| : | | | |

STORAGE SYSTEM AND CONTROL METHOD FOR THE SAME

CROSS REFERENCE TO RELATED APPLICATIONS

This application is a Continuation of U.S. application Ser. No. 12/311,519 filed on Apr. 2, 2009. Priority is claimed based on U.S. application Ser. No. 12/311,519 filed on Apr. 2, 2009, which claims priority to PCT Application PCT/JP2009/053776 filed on Feb. 23, 2009, all of which is incorporated by reference.

TECHNICAL FIELD

The present invention relates to a technique for effectively performing data protection using a differential snapshot in data backup.

BACKGROUND ART

In storage systems, and storage controller and operating system file systems, there is a known snapshot technique for use in data backup or similar where a copy (snapshot) of a volume that is in a resting state is created at a specified point in time.

There is also a known differential snapshot technique that acquires a snapshot of lower capacity than methods that create a physical copy of an entire LU or journal methods that record all data updates in chronological order, by copying, when there is any difference between the snapshot and the logical unit (LU) where the most recent data exists—the production LU, only the data from the area where the difference is.

As differential snapshot techniques, preserving snapshot data by copying pre-update data (backward differential data) to another area (Copy-on-Write) when a LU is updated after acquisition of a snapshot—the Copy-on-Write method (U.S. Pat. No. 5,649,152); and preserving snapshot data by not overwriting the original data, but writing update data (forward differential data) to another area when a LU is updated—the Redirect-on-Write method (U.S. Pat. Nos. 5,819,292 and 7,174,352) are known.

DISCLOSURE OF THE INVENTION

Problems to Be Solved By the Invention

When utilizing differential snapshot techniques in storage systems or the like, no deterioration in performance is desirable when a production LU (the LU where the original data exists) is accessed as a result of acquiring a snapshot, but cases exist where performance does drop as a result of utilizing already known differential snapshot techniques.

For example, in the Copy-on-Write method, after snapshot acquisition, when the first write is performed with respect to an address in the production LU, in addition to the normal write processing, the processing for reading backward differential data from the drive and writing it to another area that accompanies the Copy-on-Write processing takes place. As a result of this throughput drops, and when there is no open space in the write-back cache, the response time to the host also drops.

Furthermore, in the Redirect-on-Write method, with respect to a production LU, it is necessary to hold, at least for data updated after acquisition of a snapshot, metadata that links the in-volume address (host LBA) used in the host command and the address (internal address) where the data actually exists. It is also necessary to refer to the metadata when reading or writing to the production LU. In cases where the entire amount of metadata can no longer be stored in memory able to be accessed at high speed by the MPU of the controller, when reading or writing to the production LU, metadata stored on the drive sometimes has to be read, and as a result of this, throughput and response time both drop.

In light of this, the object of the present invention is the provision of a storage system that is able to prevent a deterioration in performance when a logical unit where original data exists is accessed as a result of snapshot acquisition, along with a control method for the storage system.

Means of Solving the Problems

In order to achieve the above object, the present invention is provided with a storage device that stores data, and a controller that has the storage device as an access target; and is characterized in that the controller manages data stored in logical units, from among the data stored in the storage device, by linking it to plural snapshot generations, and also manages the logical unit data in the plural generations as common data each of the generations has in common and difference data for variations between the generations of logical units, and when each generation's logical unit data is updated in accordance with a snapshot for each generation, selects the forward differential method, which writes the update data in accordance with the said update to a forward differential data storage area, or the backward differential method, which copies the pre-update data as old data to a backward differential data storage area.

EFFECTS OF THE INVENTION

According to the present invention, a deterioration in performance when a logical unit where original data exists is accessed as a result of snapshot acquisition can be prevented.

BRIEF DESCRIPTION OF THE DRAWINGS

FIG. 6 illustrates a LU configuration table structure diagram.

FIG. 7 illustrates a pool configuration table structure diagram.

MODES FOR CARRYING OUT THE INVENTION

Figure 1:
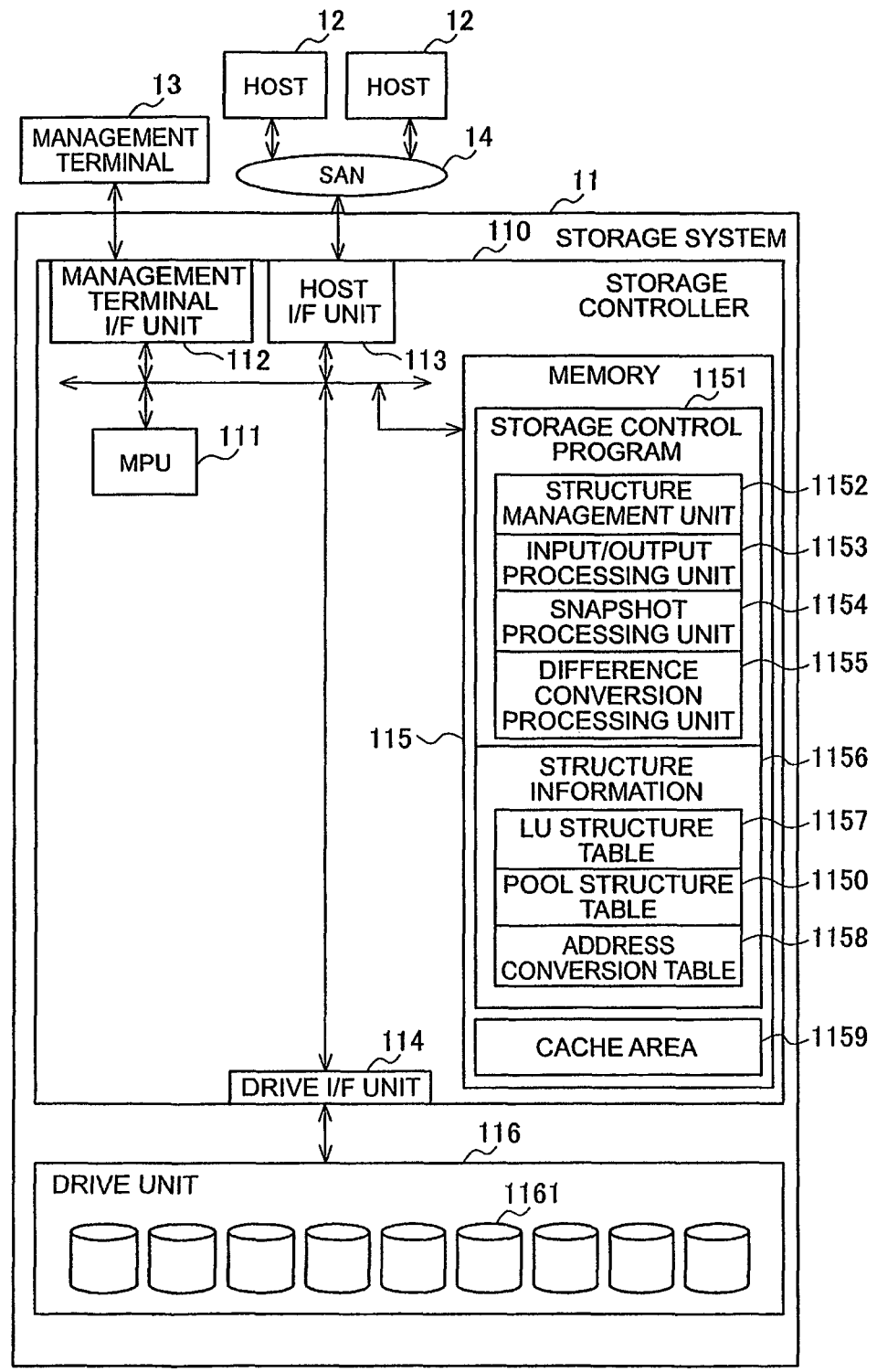
FIG. 1 illustrates a storage system configuration diagram.

Embodiments of the present invention will be explained below referring to the diagrams. FIG. 1 is a diagram showing the structure of a storage system in an embodiment of the present invention.

A storage system 11 includes a storage area, and executes read/write of the data (user data) in the storage area in accordance with commands from a host 12 connected to a SAN (Storage Area Network) 14. The form the connection between the storage system 11 and the host takes may be one of direct connection to a single host, or one of internal provision in the host. The storage system 11 also alters the parameters of the configuration of the logical units (LU) or similar inside the storage area in accordance with commands from a management terminal 13.

A storage controller 110 forms part of the storage system 11, and interprets commands received from the host 12, and executes read/write to/from the storage area included in the drive unit 116. The storage controller 110 is controlled by an MPU (Micro Processing Unit) 111, and is connected to the SAN 14 by a host I/F (interface) unit 113, and to the drive 116 unit by a drive I/F unit 114. Furthermore, it is connected to the management terminal 13 by a management terminal I/F unit 112. A memory 115 can be accessed at high speed from the MPU 111, and includes a cache area 1159 that temporarily stores user data and configuration information 1156 including all kinds of parameters for the storage system 11 and a storage control program 1151 executed in the MPU 111.

Next, a program module, which forms part of the storage control program 1151, will be explained. A configuration management unit 1152 updates and references configuration information 1156 in accordance with commands from the management terminal 13 and instructions from other program modules. An input/output processing unit 1153 interprets commands from the host 12, determines which storage area to execute read/write to/from, and executes data transfer between the drive unit 116 and the cache area 1159, and between the cache area 1159 and the host 12. A snapshot processing unit 1154 executes processing relating to snapshot acquisition (described later) and deletion. The difference conversion processing unit 1155 executes difference conversion processing in connection with the snapshots.

An LU configuration table 1157 included in the configuration information 1156 includes an LU list and all attribute information for it. A pool configuration table 1150 includes a list of pools storing snapshot difference data and all attribute information for it. An address conversion table 1158 includes the information required for snapshot utilization that links host LBAs (Logical Block Address) with internal addresses. The drive unit 116 includes from one to many drives 1161, which are final storage media. As storage devices, the drives 1161 have magnetic storage devices (hard disks) and/or flash memory and the like, and the storage destination can be designated using the drive identifiers and drive internal addresses.

Figure 2:
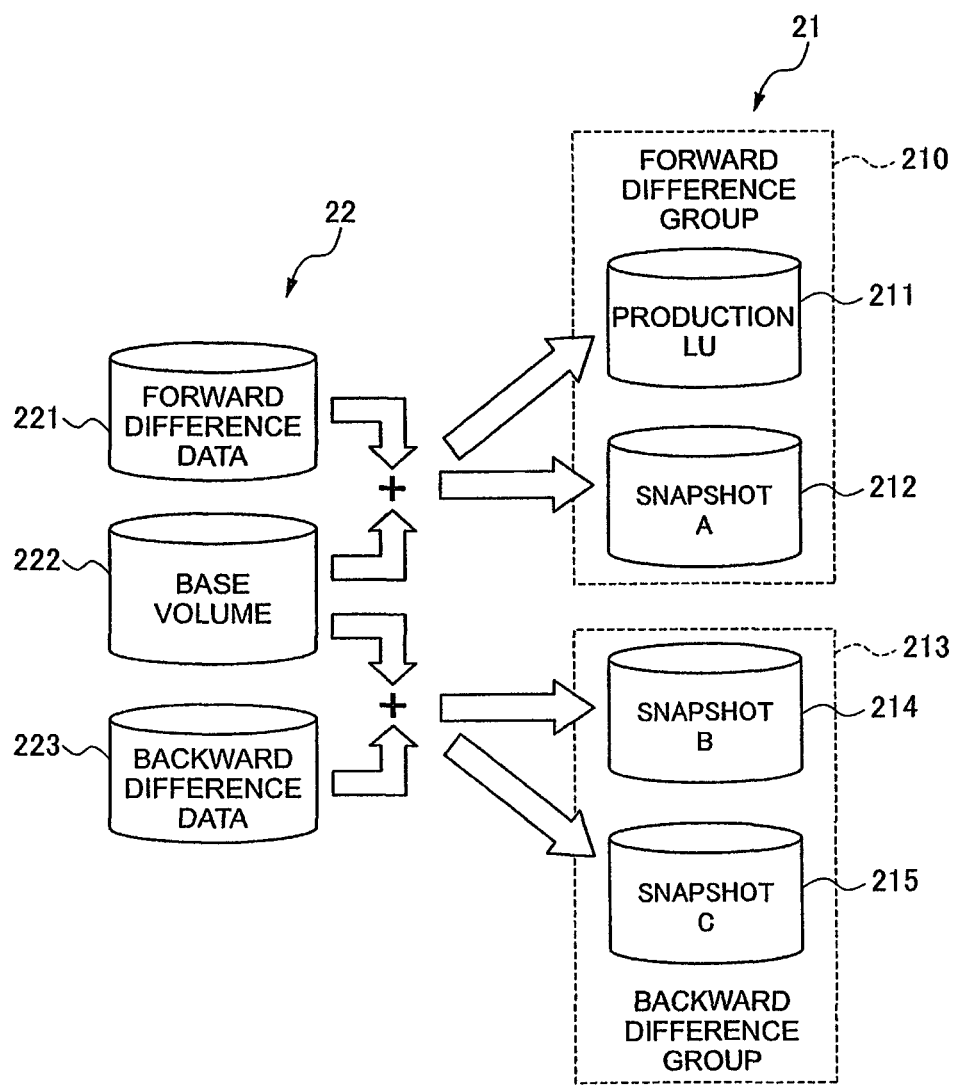
FIG. 2 illustrates an explanatory diagram of the outline of the difference management method in the snapshot function.

FIG. 2 is an explanatory diagram of the outline of the difference management method in the snapshot function in an embodiment of the present invention. Actual data 22 is actual data stored in the physical storage areas (storage areas formed from plural blocks) included in the drive units 116. Contrasting with this, virtual volumes 21 are LUs that do not have physical consecutive areas in the storage areas in the drive units 116, and indicate LUs that are established by mapping to combinations of mini-blocks included in the actual data 22. When using the snapshot function, virtual volumes 21 are used for the production LU and that snapshot.

In the FIG. 2 example, for the production LU 211, which is the original logical unit where the original data exists, snapshot A 212, snapshot B 214 and snapshot C 215—in order of acquisition recent-ness (snapshot generation order) exist.

Of these, the production LU 211 and snapshot A 212 belong to the forward differential group 210. The host LBAs for these LUs are mapped to either of the base volume 222 or the forward differential data 221, which indicates the data groups for the newer sections.

Furthermore, snapshot B 214 and snapshot C 215 are included in the backward differential group 213. The host LBAs for these LUs are mapped to either of the base volume 222 or the backward differential data 223, which indicates the data groups for the older sections. In other words, the production LU and its snapshots are included in either the forward differential group 210, which has more recent acquisition times, or the backward differential group 213, which has earlier acquisition times.

In these circumstances, taking the LUs belonging to the forward differential group 210 and the LUs belonging to the backward differential group 213 as the LUs for each generation, each generation's LU is formed from a combination of the base volume 222, which is the baseline LU each generation has in common, and the difference data, which is either the forward differential data 221 for management using the forward differential method or the backward differential data 223 for management using the backward differential method.

Figure 3:
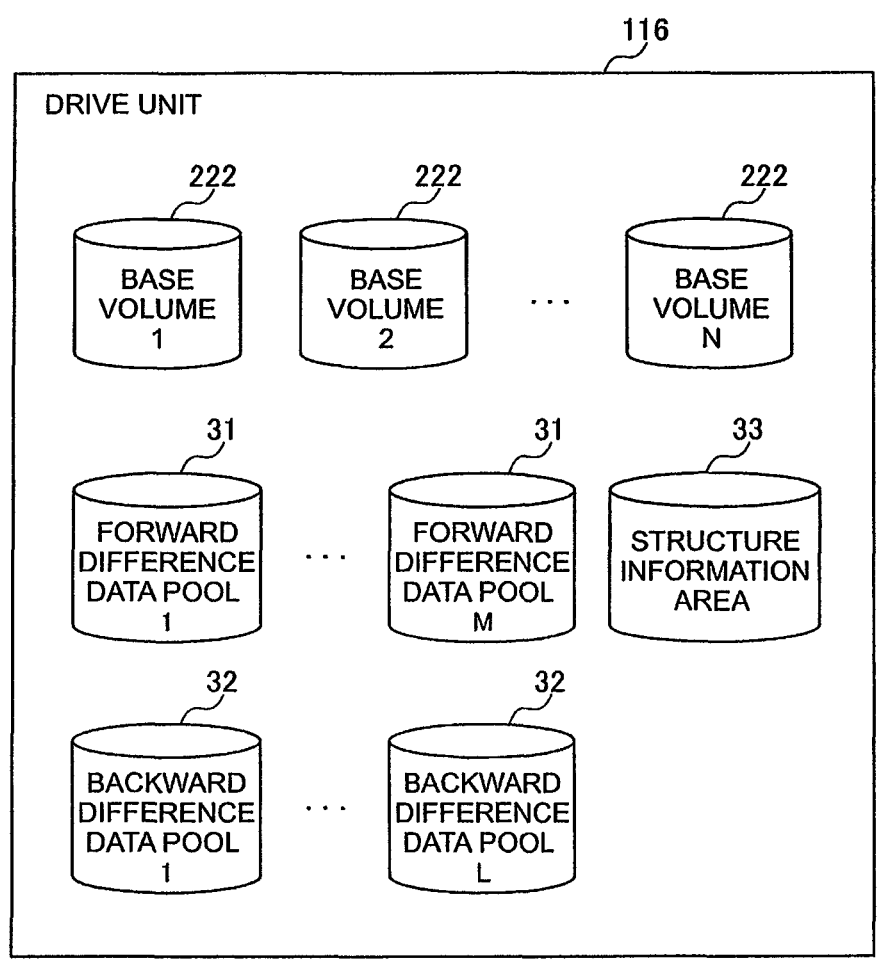
FIG. 3 illustrates a diagram showing the logical breakdown of the data included in the drive.

FIG. 3 shows the logical breakdown of the data included in the drive unit 116.

The base volumes 222, as volumes storing the data each generation has in common, correspond to the production LUs, and exist in the same numbers as the production LUs. The forward differential data pools 31 are areas where forward differential data 221 is stored. The backward differential data pools 32 are areas where backward differential data 223 is stored. A single forward differential data pool 31 or backward differential data pool 32 can be shared by plural production LUs and their snapshots. The configuration information area 33 is an area for storing the configuration information 1156 on the drive.

Figure 4:
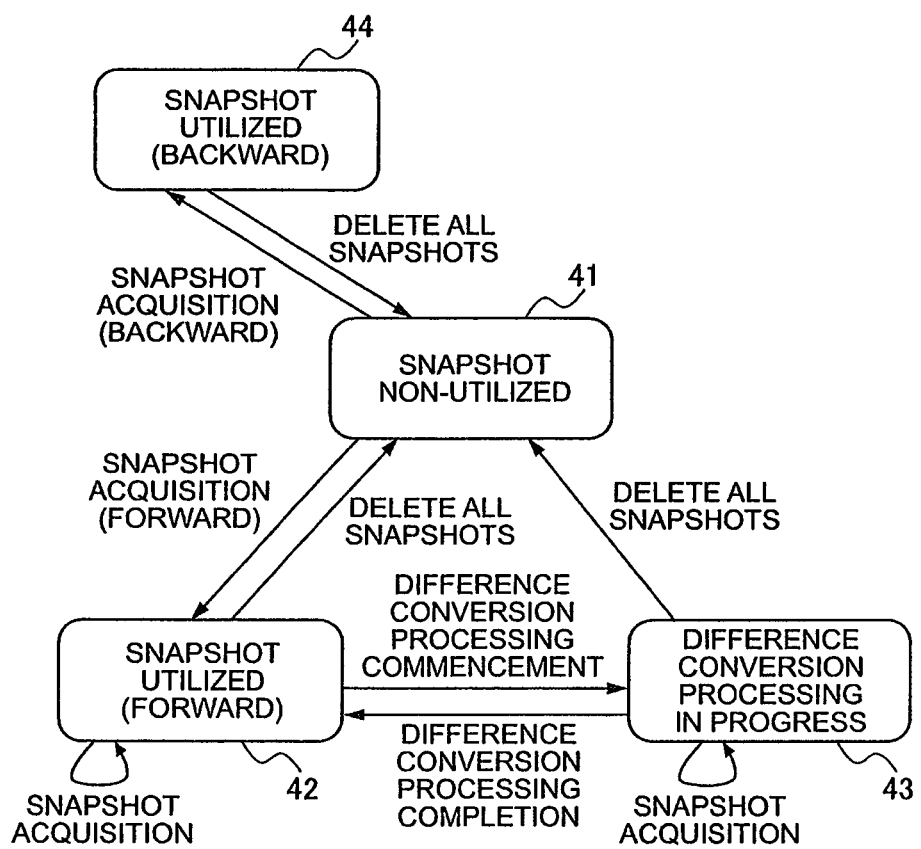
FIG. 4 illustrates a state transition diagram for a snapshot of a production LU.

FIG. 4 is a state transition diagram for a snapshot of a production LU.

The state transition for a snapshot of a production LU shows the processing state for the MPU 111, and the initial state for a production LU (state when the LU is created) is "Not Snapshot-Utilized" 41.

The MPU 111 carries out snapshot acquisition in response to instructions or similar from the management terminal 13, and it is also possible to, at this time, make it possible to choose whether to manage a production LU using the forward differential method (in the category of the Redirect-on-Write prior art method), or the backward differential method (in the category of the prior art Copy-on-Write method). When choosing the forward differential method, any deterioration in performance of the production LU can generally be reduced, but for LUs with comparatively few write commands and for which read command productivity optimization is desired, choosing the backward differential method could be considered.

When snapshot acquisition according to the forward differential method is chosen, the MPU 111 transitions to "Snapshot-Utilized (forward)" 42. In this state, difference conversion processing, which reduces the amount of forward differential data 221 by copying forward differential data 221 to the base volume 222, can be executed, and during the execution the state transitions to "Difference Conversion Processing in Progress" 43, and upon completion of the processing returns to state 42. In states 42 and 43 further snapshots can be acquired. Furthermore, by deleting all snapshots, the state transitions to 41.

When snapshot acquisition according to the backward differential method is chosen, the MPU 111 transitions to "Snapshot-Utilized (backward)" 44, and by deleting all snapshots, transitions to state 41.

Figure 5:
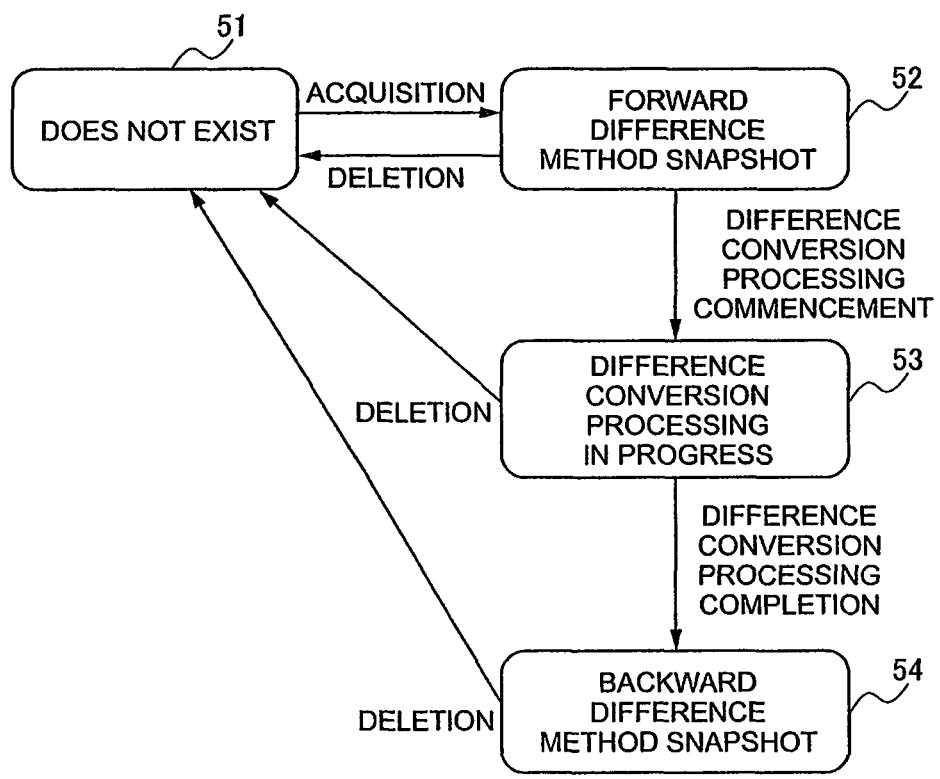
FIG. 5 illustrates a state transition diagram for a snapshot LU acquired with the forward differential method.

FIG. 5 shows the state transition for a snapshot LU acquired with the forward differential method. In the initial state for a snapshot LU, the MPU 111 processes as "Non-existents" 51, but when a snapshot is acquired using the forward differential method in a certain production LU, the state transitions to "Forward differential Method Snapshot" 52. After that, when difference conversion processing is executed with respect to the production LU, difference conversion processing for the forward differential data 221 for the said snapshot starts, and the MPU 111 transitions to "Difference Conversion Processing in Progress" 53.

In this state, when writing to the said snapshot takes place, the MPU 111 records the write data as forward differential data 221. Furthermore, upon completion of the difference conversion, the state transitions to "Backward differential Method Snapshot" 54, and when writing to the said snapshot is executed in this state, the write data is recorded as backward differential data 223. When the said snapshot is deleted the state transitions to "Non-existent" 51.

FIG. 6 shows one example of an LU configuration table 1157. Next, the attributes of the LU configuration table 1157 will be explained. The LUN 61 shows the identification numbers for the LUs. The classification 62 shows whether it is a production LU or a snapshot LU. A snapshot LU always has a production LU as a source, and is linked to its source production LU by the corresponding production LU 66.

The capacity 63 shows the capacity that can be used by the host 12. A snapshot LU holds no value here, because its capacity always matches that of the corresponding production LU.

The base volume configuration 64 shows the configuration of the base volume 222 (included drive, address range and RAID level) that corresponds to the production LU. A snapshot LU holds no value here, because it shares base volume 222 with a corresponding production LU.

The generation number 65 is an identification number for snapshot LUs acquired by the same production LU, with older acquisitions having smaller values. The difference management method 67 shows which of the forward differential method or backward differential method is being used for the difference management.

The pool ID 68 shows which data pool to use for each of the forward differential data pool 31 and backward differential data pool 32. Snapshot LUs belonging to the same production LU group hold no value here, because they share the same data pool.

The difference conversion policy 69 determines the trigger for execution of difference conversion processing with respect to a production LU. By keeping the amount of data in the forward differential data management area 91 (FIG. 9, described later) included in the address conversion table 1158 under the amount able to be stored in the memory and making access to the configuration information area 33 unnecessary when the production LU is accessed, a deterioration in the performance of the production LU can be suppressed. Because of this, execution of the difference conversion processing when the amount of data in the forward differential data management area 91 has exceeded the threshold decided from the memory capacity is best. When the threshold is decided, the time required for the difference conversion processing is taken into consideration, which includes making an allowance for setting the threshold a certain amount lower than the memory capacity.

Furthermore, it is also possible to have the difference conversion processing executed at a time earlier than when the amount of data in the forward differential data management area 91 exceeds the threshold decided from the memory capacity, or executed based on the ratio of the read access and the write access from the MPU 111 to the drive unit 116.

For measurement of the amount of data in the forward differential data management area 91, the amount of memory used in memory reservation/release for the said area may be measured, or the amount of data in the forward differential data management area 91 can be calculated from the forward differential data pool total for the entire storage system 11 in the difference amount counter 74 (FIG. 7), which shows the amount of difference data used and is included in a pool configuration table 1150.

As the difference conversion policy 69, another possible option is regular execution. This is effective in cases where, depending on the nature of the work the storage system 11 is used for, the execution of difference conversion processing is desired at a time when the burden is low.

Furthermore, because difference conversion processing can only be executed when the difference management method for the production LU is forward, setting a difference conversion policy 69 for a production LU with a backward differential management method will have no effect.

In addition to the trigger set in the difference conversion policy 69, a trigger involving having the difference conversion processing executed by the giving of a user command via the management terminal 13 could also be considered.

FIG. 7 shows one example of a pool configuration table 1150. The pool configuration table 1150 includes a list of forward differential data pools 31 and backward differential data pools 32. Their attributes will be explained below.

The pool ID 71 shows the pool identification number, and corresponds to the pool ID 68 in the LU configuration table. The volume configuration 72, in the same way as the base volume configuration 64, shows the configuration of the pool (included drive, address range and RAID level).

The difference management method 73 shows whether each pool is a forward differential data pool 31 or a backward differential data pool 32. The difference amount counter 74 shows the total capacity of the area used by any LU within the pool.

Figure 8:
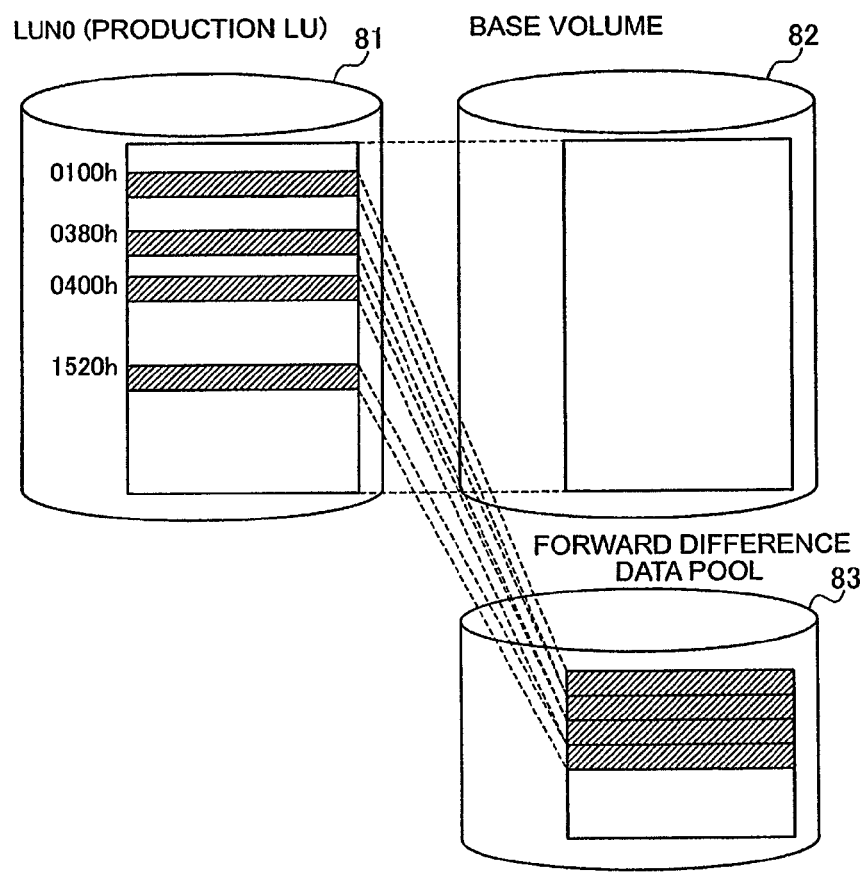
FIG. 8 illustrates a schematic view explaining an example of the address conversion information in FIGS. 9 to 12.

Next, using FIGS. 8 to 12, one embodiment of address conversion information implementing a forward differential method snapshot will be explained. FIG. 8 concerns one example of the address conversion information shown in FIGS. 9 to 12, and is a schematic view for explaining that example. LUN=0, which is a production LU 81, is formed from a base volume 82, and a forward differential data pool 83 as actual data. Within the production LU 81, for the section areas with host LBAs starting at 0100$h$, 0380$h$, 0400$h$ and 1520$h$, the actual data exists in the forward differential data pool 83, and for areas other than that it exists in the base volume 82.

Figure 9:
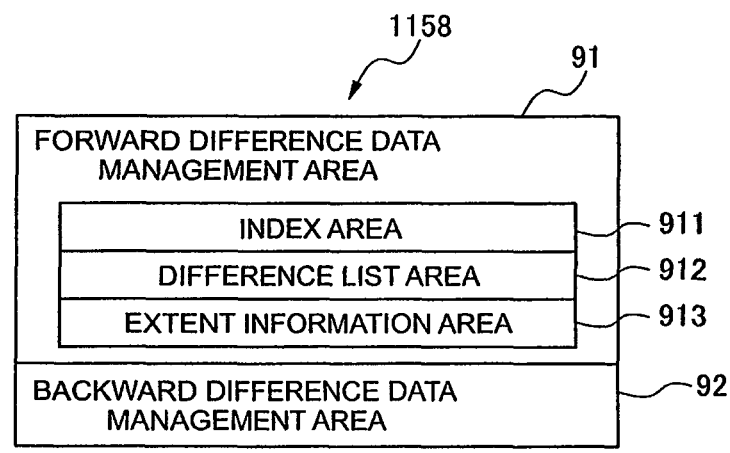
FIG. 9 illustrates an address conversion table configuration diagram.

FIG. 9 shows the structure of an address conversion table 1158. The address conversion table 1158 includes a forward differential data management area 91 holding address conversion information related to forward differential method snapshots, and a backward differential data management area 92 holding address conversion information related to backward differential method snapshots.

The forward differential data management area 91 includes an index area 911, a difference list area 912, and an extent information area 913. The respective roles of each will be explained using FIGS. 10 to 12.

Figure 10:
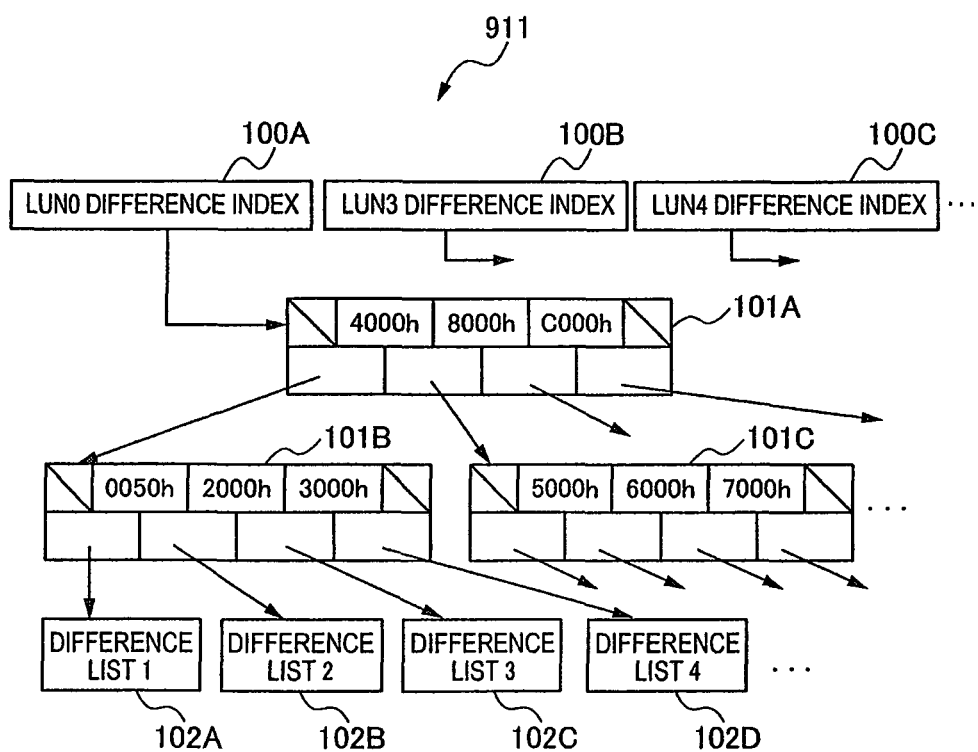
FIG. 10 illustrates an index area configuration explanation diagram

FIG. 10 shows the structure and an example of an index area 911. The role of the index area is support for high-speed searches from host LBAs, which are address conversion sources, for their corresponding entries in the difference list areas 912. Because of this, the use of generally known search algorithms with good performance is ideal. The present embodiment shows an example using the B+Tree algorithm (Organization and Maintenance of Large Ordered Indexes by R. Bayer and E. McCreight In: Acta Informatica, Vol. 1, Fasc. 3, 1972, pp. 173-189).

The difference index 100 exists for each LU that has a difference management method 67 of "forward", and is a pointer to one of the top-level internal nodes 101, which are the start points for the search.

The internal nodes 101 have plural pointers to other internal nodes 101, and plural host LBA ranges, each of which is a search condition to each pointer. The internal nodes 101 are organized in a tree structure, and are used to narrow down the range of the host LBA that is the target of the search. The pointers indicated by the internal nodes 101 sometimes also indicate difference lists 102. The difference lists 102 have a certain, set number of entries (4 in the present embodiment, as shown in the example of difference list 2 in FIG. 11), and for a certain host LBA range included in the internal nodes 101, the number of difference entries in the range is less than or equal to the number of entries which the difference list 102 can include is a condition for the pointers of the internal nodes 101 to indicate a difference list 102.

Next, an example searching for a difference list 102 corresponding to the host LBA 0400$h$ of the LUN 0 will be explained. First, the search is started from the difference index 100A of the LUN 0, and refers to the internal node 101A. In the internal node 101A, the internal node 101B is indicated as the next search destination for a host LBA smaller than 4000$h$. 0400$h$ meets this criterion, so the internal node 101B is searched. In the internal node 101B, the difference list 2 102B is indicated as the next search destination for a host LBA larger than 0050$h$ and smaller than 2000$h$. 0400$h$ meets this criterion, so the difference list 2 102B is the search result.

Figures 11A, 11B:
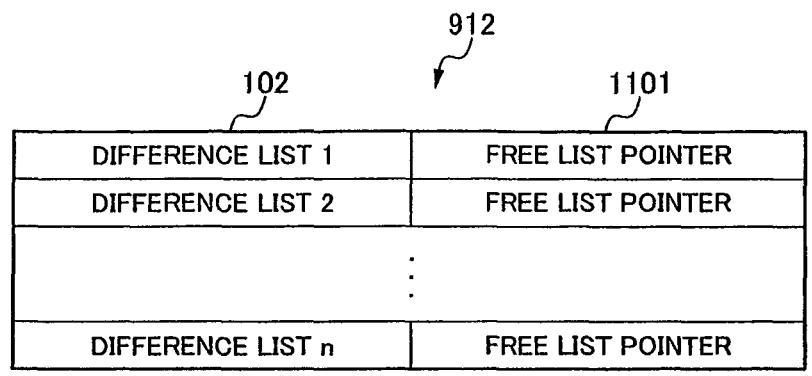
FIG. 11A illustrates a Difference list area configuration diagram.
FIG. 11B illustrates a Difference list area configuration diagram.

FIG. 11 shows the structure of a difference list area, and an example of a difference list. Plural difference lists 102 are included in a difference list area 912. Because the difference lists 102 are reserved/released from the input/output processing unit 1153 or the snapshot processing unit 1154, depending on the creation/deletion of difference data, empty difference lists are connected to a free list and managed. The free list pointers 1101 are pointers for forming the free list. They require management by the free list or similar, because they are dynamically reserved/released depending on the amount of difference data in the same way as the internal nodes 101.

Next, the attributes included in the difference lists 102 will be explained. The Start LBA 1102 shows the host LBA start value corresponding to the difference data. The Length 1103 shows the length of the difference data. The Extent ID 1104 shows the identification number for the extent (described later), which is the actual data corresponding to the host LBA range indicated by the Start LBA/Length 1103. The Offset 1105 shows the offset address where the actual data starts inside the extent.

In the example of difference list 2 102B, it is shown that, for the first entry, the actual data corresponding to the host LBA range 0100$h$-0179$h$ is the actual data where Extent ID=1 and Offset=0.

Figures 12A, 12B:
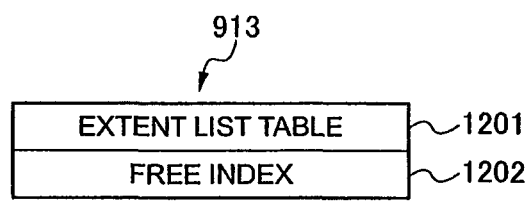
FIG. 12A illustrates an extent information area configuration diagram.
FIG. 12B illustrates an extent list table configuration diagram.

FIG. 12 shows the structure of an extent information area 913, and an example of an extent list table 1201. An extent is a variable size data block included in a forward differential data pool 31 and able to occupy a size of a specified number of sectors. The difference data generated by LUs utilized by the forward differential method is stored as extents in the forward differential data pool 31. Information showing the attributes of each extent is included in the extent list table 1201.

Furthermore, within the forward differential data pool 31, the non-reserved extent area is managed using a free index 1202. Next, the attributes included in the extent list table 1201 will be explained. The Extent ID 1203 shows the identification number for the extent inside the forward differential data pool 31, and corresponds to the Extent ID 1104 in the difference list 102. The Pool-Internal Start LBA 1204 shows the LBA where the actual data for the said extent starts inside the forward differential data pool 31. The Length 1205 shows the length of the data in the said extent. The Reference Counter 1206 shows the number of LUs included in the said extent as difference data.

Figure 13A:
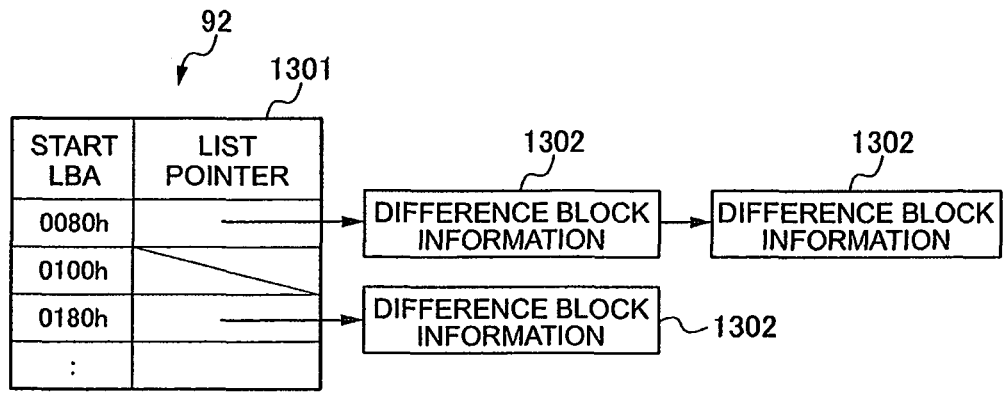
FIG. 13A illustrates a backward differential data management area configuration diagram.
Figure 13B:
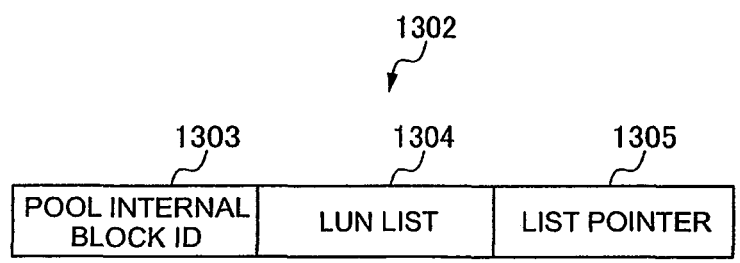
FIG. 13B illustrates a difference block information configuration diagram.

FIG. 13 shows the structure of a backward differential data management area 92. It shows a method of realizing difference data using fixed length difference blocks as one example of implementing a backward differential method snapshot. A difference block management table 1301 exists corresponding to the LU groups in the same production LU that have a difference management method 67 of "backward", and shows the correspondence relationships between the host LBA and the list of difference block information 1302. The list of difference block information 1302 shows the correspondence relationships between the LUNs and the difference blocks inside the pool for LUs where a backward differential data exists. The Pool-Internal Block ID 1303 shows the identification number for the difference block inside the pool, while the LUN 1304 shows the list of LUs holding difference data in the said difference block. The list pointer 1305 is a pointer required to form the list of difference block information 1302.

In FIGS. 9 to 13, when the address conversion table 1158 is of a size that exceeds the permitted area in the memory 115, adopting a method where, by constructing virtual storage or similar, a section of the address conversion table 1158, which has its entirety included in the configuration information area 33, is arranged in the memory 115 can be considered.

Figure 14:
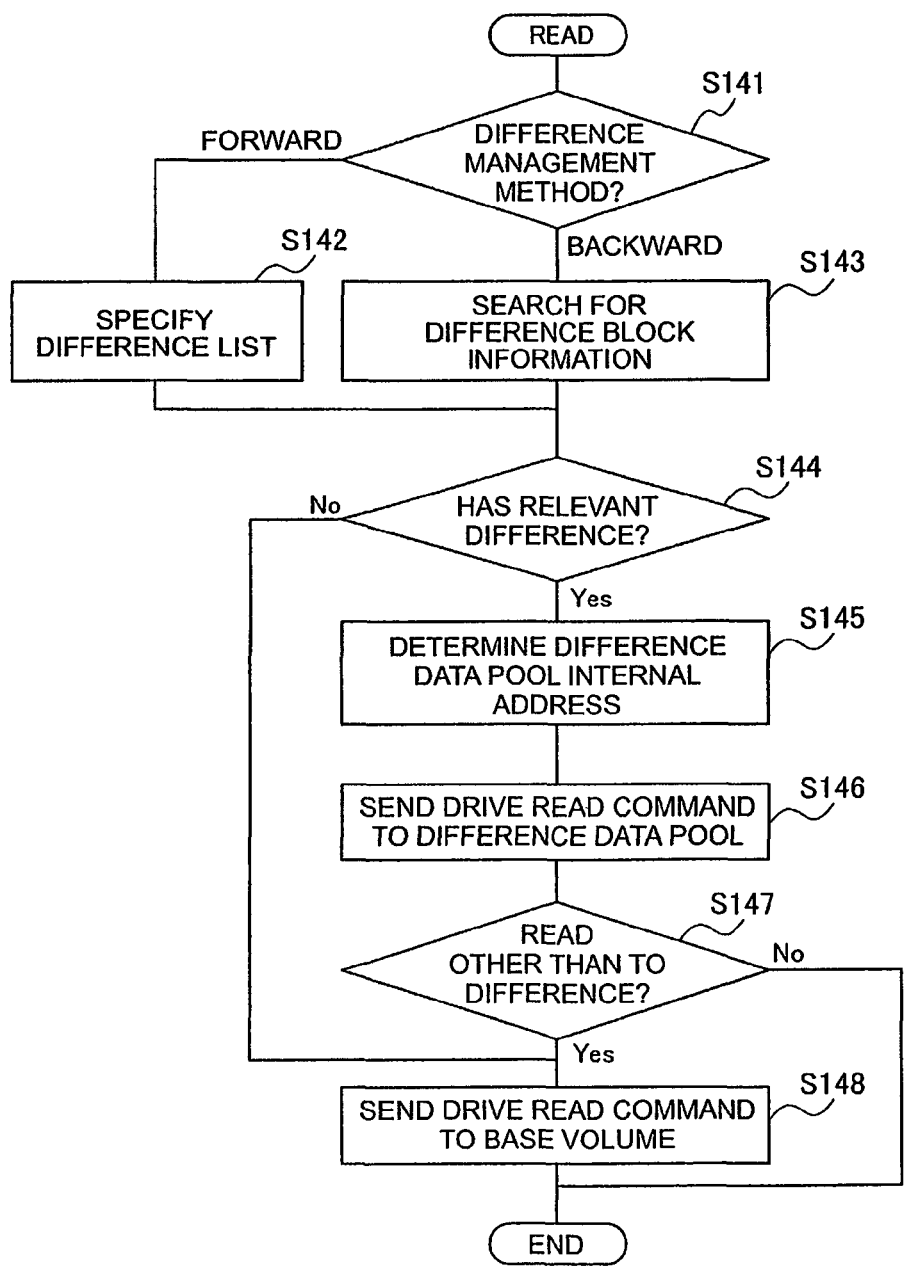
FIG. 14 illustrates a flowchart for the processing for reading from the drive unit when a read command is executed.

FIG. 14 shows a Flowchart for the processing for reading from the drive unit 116 when a read command is executed. The following processing is executed by the MPU 111.

In step S141, processing path selection takes place according to the difference management method of the LUs targeted by the read command.

If the difference management method is the forward differential method, in step S142, a search of the indexes included in the index area 911 is executed, based on the host LBA in the read command, and with the difference index 100 of the target LU as the starting point. In this fashion, the extent corresponding to the target host LBA is sought, and if it exists, its Extent ID 1203 is sought.

If the difference management method is the backward differential method, in step S143, the backward differential data management area 92 is searched, based on the host LBA in the read command, and the difference block corresponding to the target host LBA is sought, and if it exists, its Pool-Internal Block ID 1303 is sought.

In step S144, processing path selection takes place depending on the existence or non-existence of difference data corresponding to the target host LBA (extent or difference block). If the difference data exists, then the reading of the difference data in steps S145 and S146 is executed.

In step S145, the difference data pool internal address corresponding to the difference data (the drive 1161 and internal LBA) is determined in based on the information for the difference data sought in step S143 or S144. When determining the address, if the volume is one utilizing RAID, address conversion based on the RAID method also takes place.

In step S146, a read command is issued to the drive 1161 in the difference data pool, and data transfer from the drive 1161 to the cache area 1159 is executed.

In step S147, whether a section that does not include difference data exists in the range of the target host LBA is judged. If it does exist, step S148 is executed. Step S148 is also executed when it is judged that difference data is not included in the range of the target host LBA in step S144.

In step S148, a read command is issued to the drive 1161 in the base volume 222, and data transfer from the drive 1161 to the cache area 1159 is executed.

When a read command is executed, the processing for reading from the drive unit 116 is executed according to the above steps.

FIGS. 15 to 18 show Flowcharts for the processing for writing to the drive unit 116 when a write command is executed.

Figure 15:
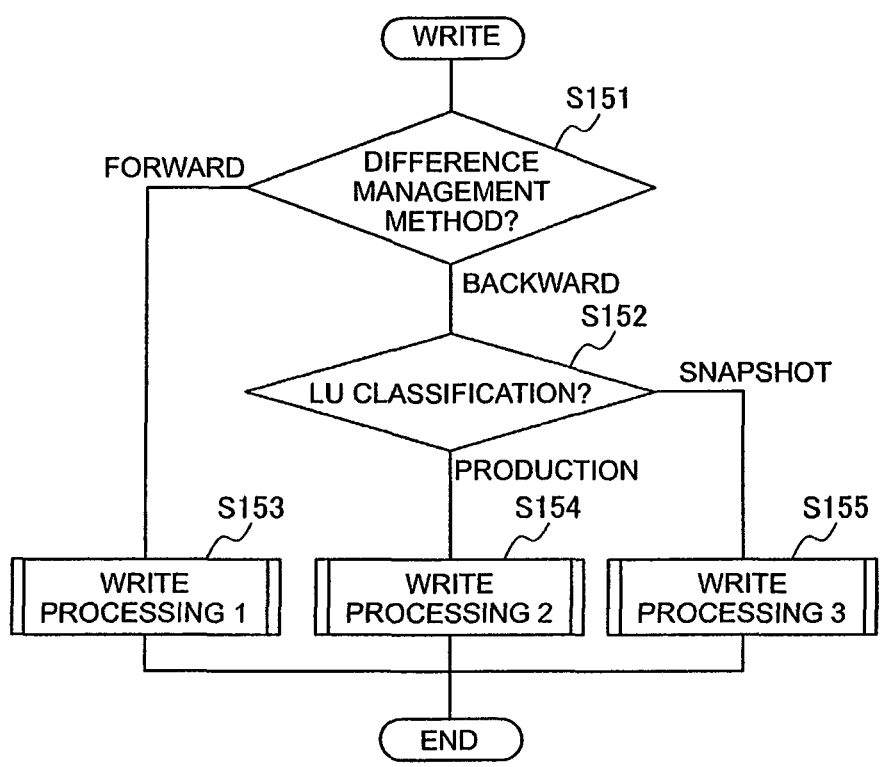
FIG. 15 illustrates a flowchart for the write method selection processing when a write command is executed.

FIG. 15 shows a Flowchart for the write method selection processing when a write command is executed. As the write processing varies depending on the difference management method and classification of the target LU, the different types will be explained in FIGS. 16 to 18 as Write Processing 1 (when the target LU uses the forward differential method; step S153), Write Processing 2 (when the target LU uses the backward differential method, and is a production LU; step S154) and Write Processing 3 (when the target LU uses the backward differential method, and is a snapshot LU; step S155), respectively. The following processing is executed by the MPU 111.

The backward differential method is different in that where the write data for the production LU is written to the base volume 222, the write data for the snapshot LU is written to the backward differential data pool 32.

First, when the write method selection processing takes place, the MPU 111, in step S151, carries out processing path selection based on the difference management method, and when the difference management method is the backward differential method, in step S152, also carries out processing path selection based on the classification of the LU.

Figure 16:
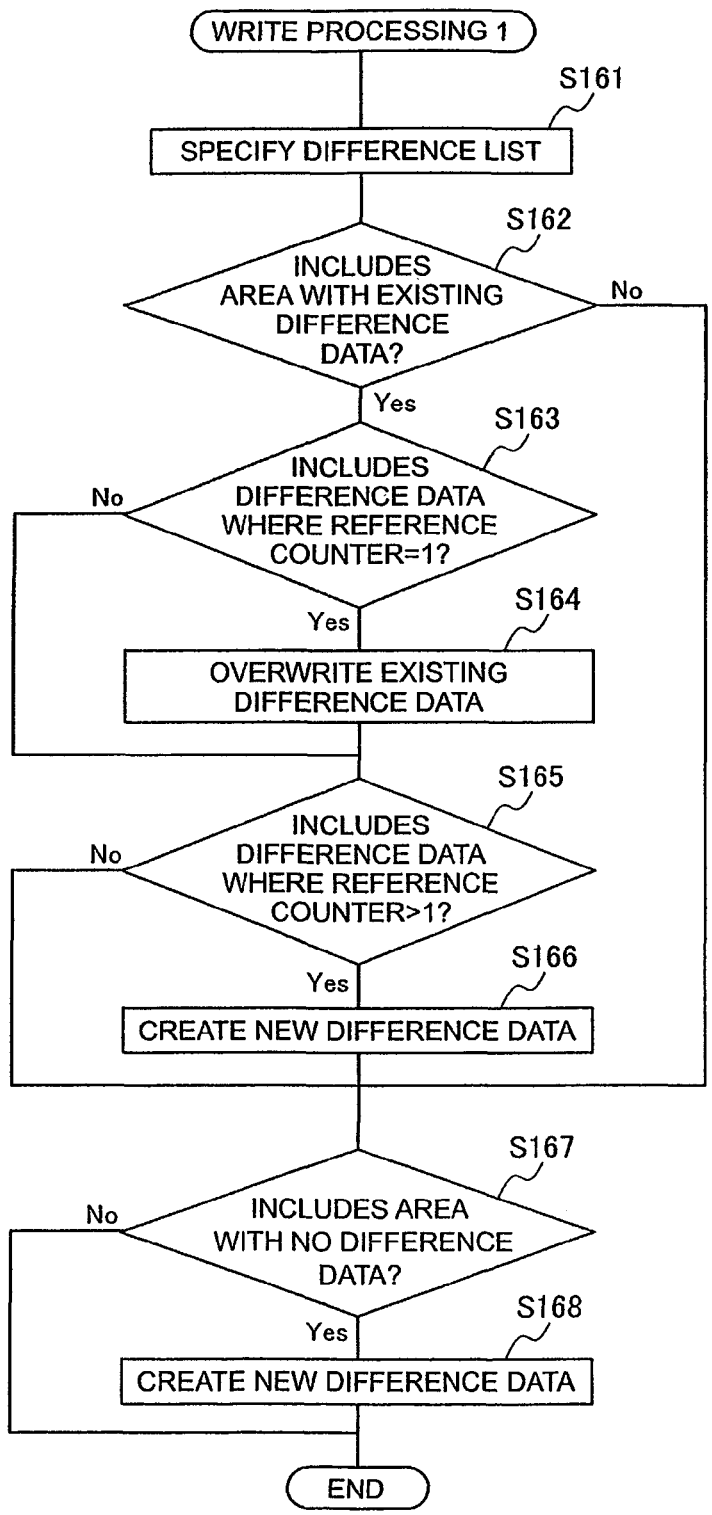
FIG. 16 illustrates a flowchart for the processing for writing to the drive unit when a write command is executed in the forward differential method.

FIG. 16 shows a Flowchart for the processing for writing to the drive unit 116 when a write command is executed in the forward differential method. The following processing is executed by the MPU 111.

In step S161, like in step S142 in the read processing, the extent corresponding to the target host LBA is sought, and if it exists, its Extent ID 1203 is sought.

In step S162, based on the result of step S161, if the extent corresponding to the target host LBA exists, the processing proceeds to step S163, and if the extent doesn't exist, the processing proceeds to step S167.

In step S163, processing path selection takes place based on the reference counter 1206 of the said extent. If the extent is one where the reference counter=1, because it is not shared by any LU other than the target LU, the processing proceeds to step S164, and the extent is overwritten with the write data. There are cases where plural extents exist in the range of the target host LBA, and the processing in step S164 is executed for all extents of those extents where the reference counter=1.

In step S165, like in step S163, processing path selection takes place based on the reference counter 1206 of the said extent. If the extent is one where the reference counter>1, because it is shared by a LU other than the target LU, if the extent is overwritten, the data in the other LU sharing the extent will also be altered. In order to prevent this, the processing proceeds to step S166, reserves a new extent, and writes the write data.

In step S167, whether a range where actual data exists in the base volume 222—not an extent, i.e., a range not written to in either of steps S164 and S166, exists within the range of the target host LBA is judged. If one exists, the processing proceeds to step S168, reserves a new extent corresponding to the range, and writes the write data.

When a write command in the forward differential method is executed, the processing for writing to the drive unit 116 is executed according to the above steps.

Figure 17:
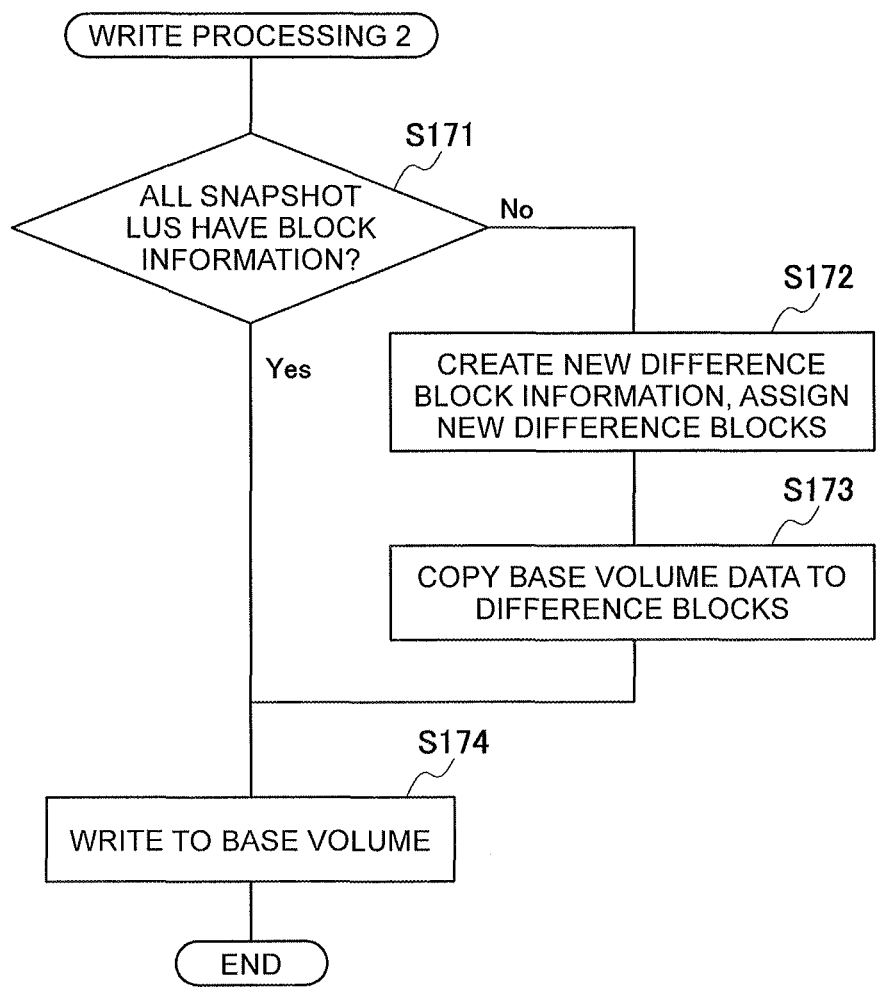
FIG. 17 illustrates a flowchart for the processing for writing to the drive unit when a write command is executed with respect to a production LU in the backward differential method.

FIG. 17 shows a Flowchart for the processing for writing to the drive unit 116 when a write command is executed with respect to a production LU in the backward differential method. The following processing is executed by the MPU 111 activating the snapshot processing unit 1154.

When writing to a production LU, the base volume 222 is the write destination, and at this time, in order to save the snapshot LU, the pre-update data must be saved as a difference block in the backward differential data pool 32. If any unsaved snapshot LU data exists, execution of save processing is also necessary.

From this kind of viewpoint, the MPU 111, in step S171, judges whether all snapshot LUs for the target host LBA already have difference blocks, i.e., whether they are included in any of the LUN lists 1304 of difference block information 1302 for the target host LBA in the difference block management table 1301. If all snapshot LUs already have difference block information, and there is no need to execute save processing, the processing proceeds to step S174. Otherwise, it proceeds to step S172 in order to execute save processing.

In step S172, new difference block information 1302 is created, and connected to the list pointer of the target host LBA. The LUNs for all of the snapshot LUs are then included in the LUN list 1304 for the difference block information.

In step S173, the pre-update data for the target host LBA in the base volume 222 is copied to the difference block.

In step S174, write data is written to the target host LBA in the base volume 222.

When a write command is executed with respect to a production LU in the backward differential method, the processing for writing to the drive unit 116 is executed according to the above steps.

Figure 18:
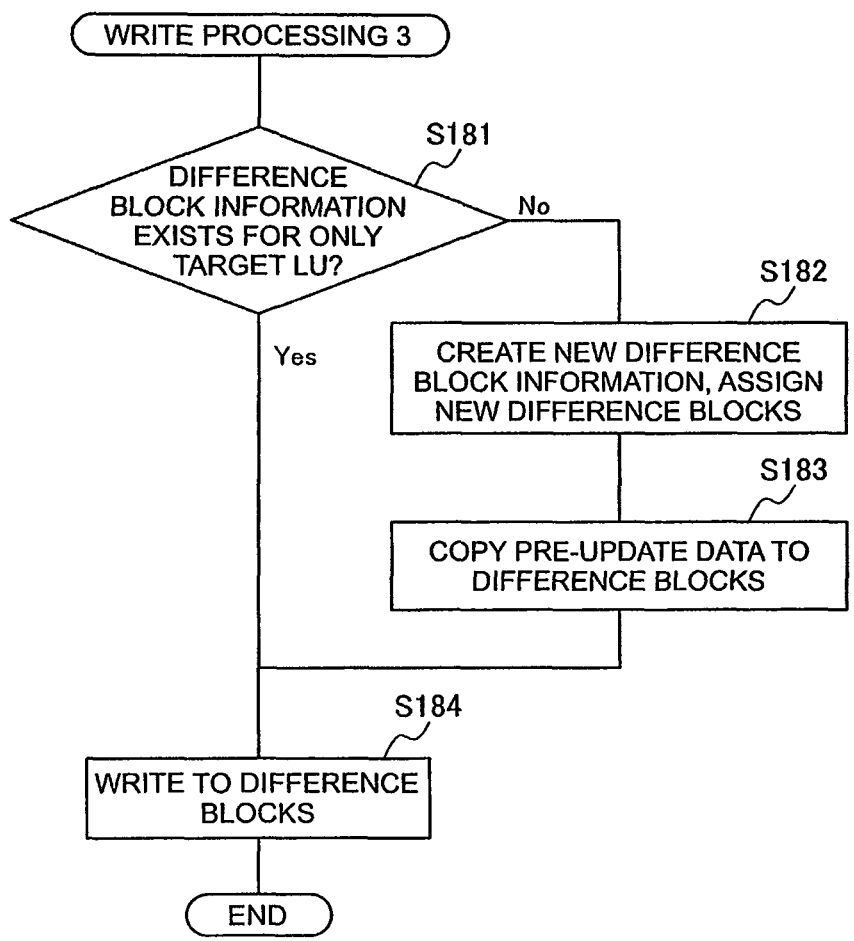
FIG. 18 illustrates a flowchart for the processing for writing to the drive unit when a write command is executed with respect to a snapshot LU in the backward differential method.

FIG. 18 shows a Flowchart for the processing for writing to the drive unit 116 when a write command is executed with respect to a snapshot LU in the backward differential method. The following processing is executed by the MPU 111 activating the snapshot processing unit 1154.

When writing to a snapshot LU, the backward differential data pool 32 is the write destination, but in cases where no difference blocks are reserved, or the difference blocks are shared with other snapshot LUs, it is necessary to reserve a new difference block, and execute a copy of the pre-update data.

From this kind of viewpoint, the MPU 111, in step S181, judges whether difference blocks for the target host LBA already exist, and whether they reference only the said snapshot LU. If they meet those conditions, there is no need to reserve any new difference block, so the processing proceeds to step S184. If the conditions are not met, the processing proceeds to step S182.

In step S182, new difference block information 1302 is created, and connected to the list pointer of the target host LBA. Because only the LUN for the said snapshot LU is then included in the LUN list 1304 for the difference block information, if there is any difference block information for the said LBA of the said snapshot LU already existing, the LUN of the said snapshot LU is deleted.

In step S183, the pre-update data in the base volume 222 or the backward differential data pool 32 is copied as old data to the difference block. Next, in step S184, the difference block is overwritten with the write data.

When a write command is executed with respect to a snapshot LU in the backward differential method, the processing for writing to the drive unit 116 is executed according to the above steps.

Figure 19:
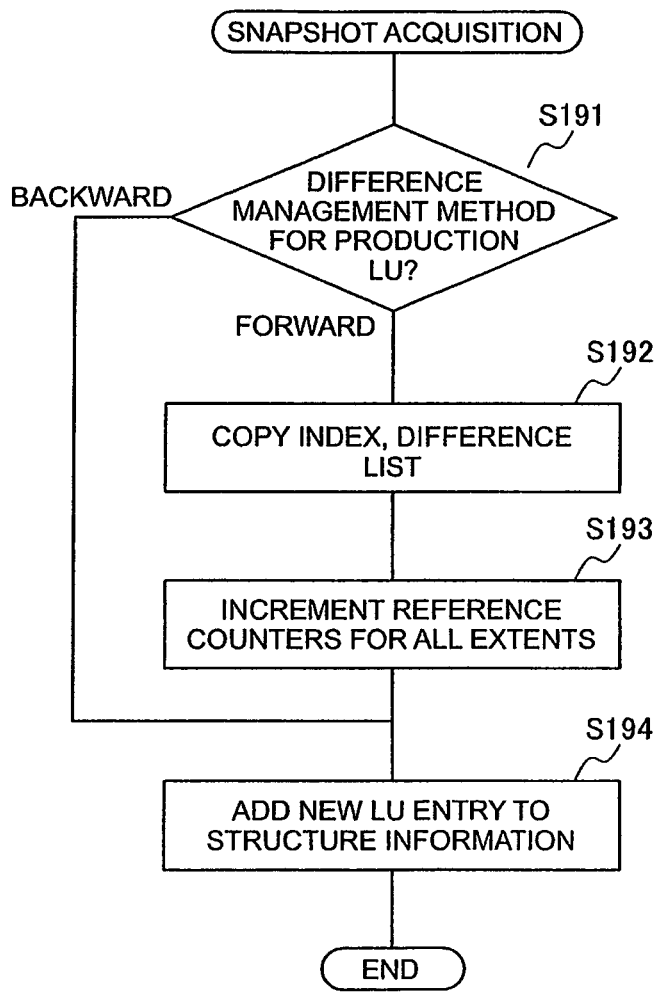
FIG. 19 illustrates a snapshot acquisition processing Flowchart.

FIG. 19 shows a snapshot acquisition processing Flowchart. The following processing is executed by the MPU 111 activating the snapshot processing unit 1154.

First, the MPU 111, in step S191, carries out processing path selection based on the difference management method of the production LU that is the target of the snapshot acquisition.

When the difference management method is the forward differential method, because the LUs separately require a difference index 100 and index information made up of an internal node 101 and a difference list 102, in step S192, the index information for the production LU is copied as index information for a new snapshot LU.

In step S193, the reference counters 1206 for all of the extents included in the production LU are incremented. When a snapshot LU is deleted the reference counters 1206 for all of the extents included in the snapshot LU are decremented. In steps S192 and S193, the execution of a host command must be exclusive execution.

In step S194, an entry showing the new snapshot LU is added to the LU configuration table 1157.

Figure 20:
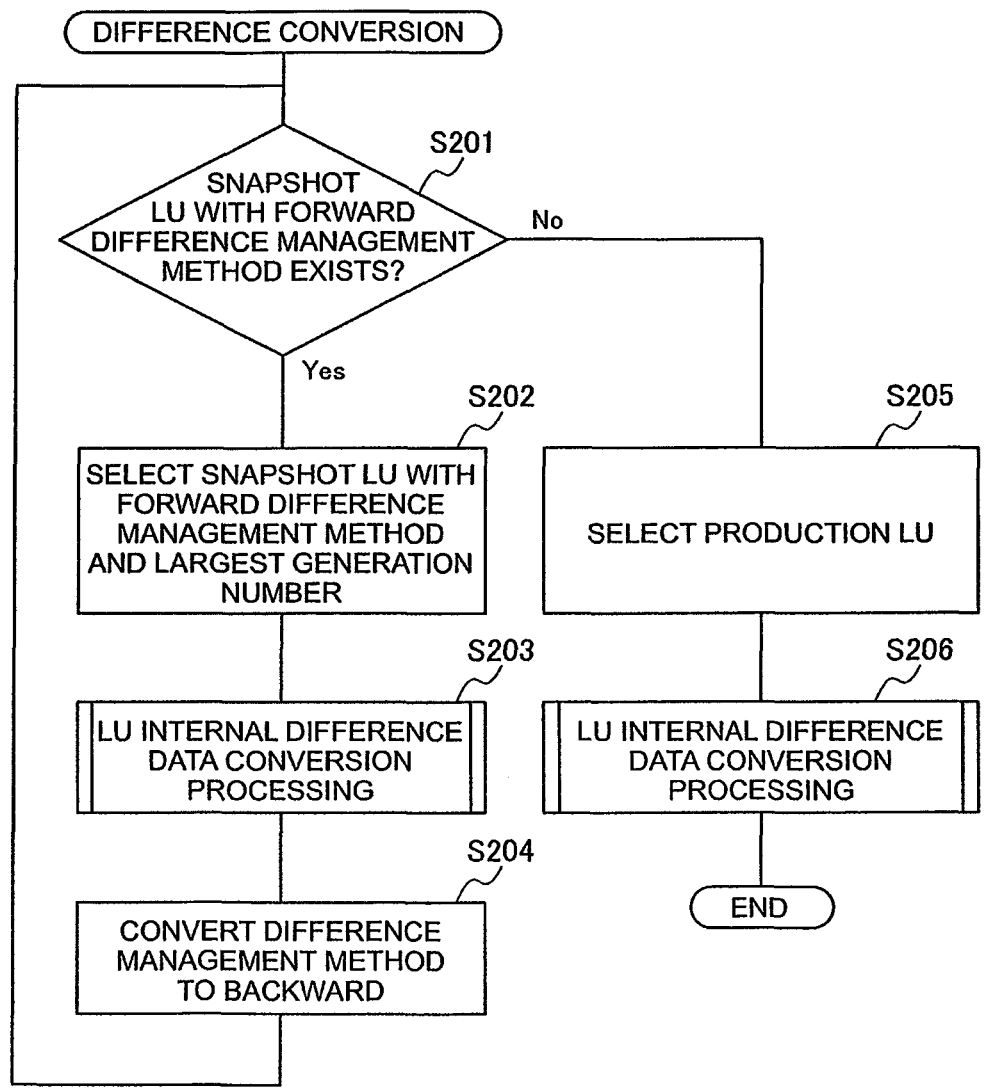
FIG. 20 illustrates a flowchart determining the order for executing difference conversion processing for LUs.
Figure 21:
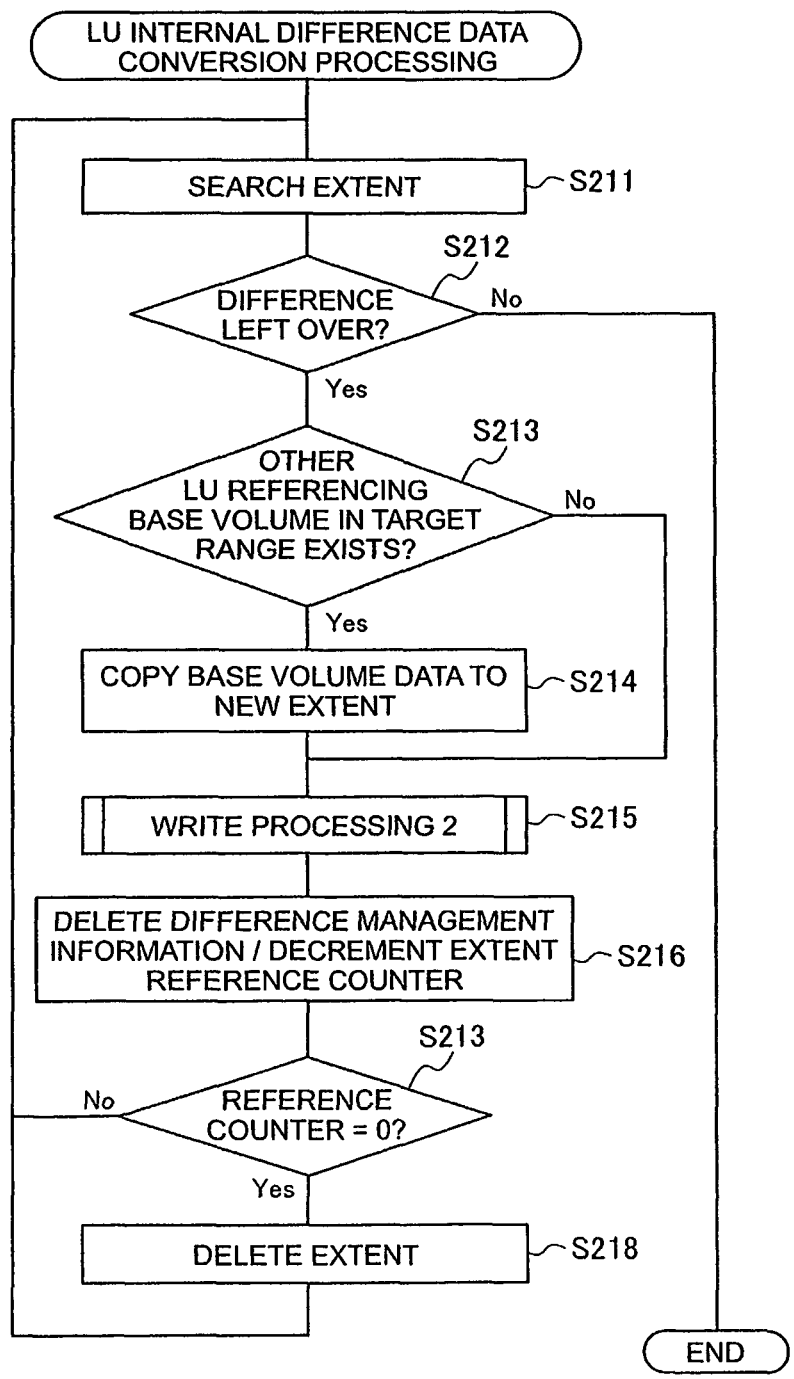
FIG. 21 illustrates a LU internal difference data conversion processing Flowchart.

FIGS. 20 and 21 show difference conversion processing Flowcharts. Difference conversion processing is processing that deletes the forward differential data 221 belonging to the snapshot LUs and production LUs in the forward differential method by writing the forward a difference data 221 to the base volume 222, and saving the data in the base volume 222 before that write as backward differential data 223.

FIG. 20 shows a Flowchart determining the order for LUs executing difference conversion processing. The difference conversion processing is executed in order of oldest acquisition for all snapshot LUs that are of the forward differential method and belong to the production LU that is the target of the processing. Next, it is executed with respect to the production LU. The following processing is executed by the MPU 111 activating the difference conversion processing unit 1155.

First, the MPU 111, in step S201, based on the LU configuration table 1157, judges whether any snapshot LUs that belong to the production LU that is the target of the processing and have a difference management method that is the forward differential method exist. If any exist, the processing proceeds to step S202, and if none do, the processing proceeds to step S205.

In step S202, from among the snapshot LUs that belong to the production LU that is the target of the processing and have a difference management method 67 that is the forward differential method, the one with the largest generation number 65, i.e., the one with the oldest acquisition time, is searched for.

In step S203, LU internal difference data conversion processing is executed with the LU searched for in step S202 as the target. The details of the LU internal difference data conversion processing will be described later, with reference to FIG. 21.

In step S204, the difference management method 67 for the snapshot LU for which the LU internal difference data conversion processing has finished in step S203 is changed to "backward".

If a forward differential method snapshot LU does not exist before difference conversion processing starts, or if all of the LU internal difference data conversion processing has been completed, the processing proceeds to step S205, and selects the production LU as a target.

In step S206, LU internal difference data conversion processing is executed with the production LU selected in step S205 as a target.

Furthermore, with the object of executing different conversion processing, other than the hereunto explained reduction of forward differential data 221, the changing of the difference management method for the production LU from the forward differential method to the backward differential method could be considered. Changing the difference management method from the forward differential method to the backward differential method is effective when the production LU's access pattern has changed over time from one with comparatively lots of writing, which is suited to the forward differential method, to one where the amount of writing has become less, which is suited to the backward differential method. Executing difference conversion processing with this purpose by the giving of a user the command by the management terminal 13 as the trigger could be considered.

FIG. 21 shows a Flowchart of LU internal difference data conversion processing. LU internal difference data conversion processing reflects all of the forward differential data 221 belonging to the target LU in the base volume 222. The following processing is executed by the MPU 111 activating the difference conversion processing unit 1155.

First, the MPU 111, in step S211, searches the forward differential data management area 91 and selects a single extent belonging to the target LU.

Next, the MPU 111, in step S212, selects a processing path based on the existence of an extent belonging to the target LU. If an extent does not exist, the LU internal difference data conversion processing is terminated. In order to perform a speedy confirmation of the existence of an extent, a method in which a special counter for the number of extents belonging to the LU is provided, and is incremented when an extent is assigned, and decremented when an extent is removed could be considered.

Furthermore, for example, when a search of extents has been performed in ascending order of host LBAs, because extents newly assigned during LU internal difference data conversion processing escape being targets of conversion, a method where such extents are listed, and after the search/processing based on the host LBA is completed, conversion processing takes place for the extents in that list could be considered.

Next, the MPU 111, in step S213, judges whether other forward differential method LUs that reference the base volume 222 of the host LBA range of the extent selected in step S211 exist or not. Where they do exist, when the extent data is reflected in the base volume 222, the data in the LUs referencing the pre-reflection data will be destroyed. To prevent from such destruction, the MPU 111, in step S214, with the object of saving data, assigns a new extent to the said LU, and carries out a copy of the data in the base volume 222 to that extent before reflecting the extent data in the base volume 222.

After that, the MPU 111, in step S215, executes the Write Processing 2 explained using FIG. 17. Write Processing 2 is processing in which the data in the base volume 222 is saved as backward differential data 223, after which the base volume 222 is written to. The data written is the extent data selected in step S211.

In step S216, as pre-processing for deleting an extent, the difference management information indicating the extent is deleted from the difference list 102, and the reference counter 1206 corresponding to the extent is decremented from the extent list table 1201.

In step S216, whether the reference counter 1206 is 0 or not is judged. If it is 0, there are no other LUs referencing the extent, and deletion is possible, so the processing proceeds to step S218, the extent list table 1201 is updated, and deletion of the extent is carried out.

When step S217 or step S218 is complete, the processing returns to step S211 in order to execute the difference conversion processing for all of the extents belonging to the target LU in a loop.

In step S212, whether or not any unprocessed extents belonging to the target LU exist is checked, and it is necessary to inhibit writing during the period from the start of the check until the change of difference management method in step S204 in FIG. 20, so that no new extents are assigned.

According to the present embodiment, a storage controller 110 is provided with a snapshot processing unit 1154 that manages data stored in logical units, from among the data stored in a drive unit 116, by linking it to plural generations of snapshots 212, 214, 215, and the snapshot processing unit 1154 also manages the logical unit data in the plural generations as a base volume 222 that is common data each of the generations has in common and difference data (221, 223) that is variations between the generations of logical units, and because it has been designed to be able to, when each generation's logical unit data is updated in accordance with a snapshot for each generation, select the forward differential method, which writes the update data in accordance with the said update to the forward differential data pool 31, which is the forward differential data storage area, or the backward differential method, which copies the pre-update data as old data to the backward differential data pool 32, which is the backward differential data storage area, a deterioration in performance when a production logical unit is accessed as a result of snapshot acquisition can be prevented.

According to the present embodiment, when each generation's logical unit data is updated in accordance with a snapshot for each generation, the snapshot processing unit 1154 writes the update data in accordance with the said update as forward differential data 221 to the base volume 222, and saves the old data that existed in the base volume 222 before that update data was written as backward differential data 223 in the backward differential data pool 32, and because it has been designed to, when each generation's logical unit data is updated, delete the production LUs within each generation of LUs, along with the forward differential data 221 in the snapshots 212 that together with those production LUs forms the forward differential group 210, for production LUs utilizing snapshots using the forward differential method, the amount of metadata necessary for executing a host command is able to be reduced by the execution of difference conversion processing.

As a result of this, the total amount of metadata can be suppressed to a set level or below, and, for example, by suppressing it to stay under the capacity of the memory, drive access for reading metadata can be made unnecessary, and a decline in performance as a result of snapshot utilization can be prevented.

Furthermore, because the production LU uses the forward differential method, drive access for saving pre-update data, like in the backward differential method, can be made unnecessary, and a decline in performance as a result of snapshot utilization can be prevented.

According to an embodiment of the present invention, because the timing of the execution of difference conversion processing can be selected, the difference conversion processing can be executed at a point in time when the burden is light, and a decline in performance can be prevented.

According to an embodiment of the present invention, the most suitable difference management method can be selected—such as the forward differential method for production LUs where read/write takes place, and the backward differential method for production LUs that are mostly read only.

According to an embodiment of the present invention, the difference management method can be changed from the forward differential method to the backward differential method when the production LU's access pattern has changed over time from one suited to the forward differential method to one suited to the backward differential method.

The invention claimed is:
1. A storage system, comprising:
a storage device that stores data; and
a storage controller having the storage device as an access target, the storage controller including a logical unit that is associated with the data stored in the storage device, the logical unit including a plurality of snapshot generations,
wherein the storage controller manages, when-updating data stored in the storage device, the plurality of snapshot generations using a forward differential method in which each new data is written in an area that is different from an area in which corresponding former data was stored and a backward differential method in which each new data is written alter corresponding former data is copied to a different area, wherein each snapshot generation included in the plurality of snapshot generations belongs to one of a forward differential group managed using the forward differential method and a backward differential group managed using the backward differential method, wherein the storage controller maintains information indicating whether each of the plurality of snapshot generations is an initial production generation for the plurality of snapshot generations, indicating whether each of the plurality of snapshot generations is managed using the forward differential method or the backward differential method, and indicating a corresponding relationship between the initial production generation and each of the other snapshot generations of the plurality of snapshot generations, wherein, in response to receiving a read command, the storage controller selects a method for determining a read destination address based on whether the snapshot generation targeted by the read command is managed using the forward differential method or the backward differential method;

wherein, in response to receiving a write command, the storage controller selects a method for determining a write destination address based on whether the snapshot generation targeted by the write command is managed using the forward differential method or the backward differential method and further based on whether the snapshot generation targeted by the write command is the initial production generation for the plurality of snapshot generation wherein the snapshot generation targeted by the write command is managed using the backward differential method;

wherein the storage system further comprises:
a base volume storing data that is commonly used between the forward differential group and the backward differential group;
one or more forward differential data pools that store difference data in comparison with the data of the base volume that belongs to the forward differential group; and
one or more backward differential data pools that store difference data in comparison with the data of the base volume that belongs to the backward differential group, and
wherein the base volume is shared by the forward differential group and the backward differential group.

2. The storage system according to claim 1, wherein each snapshot generation that belongs to the forward differential group is newer than each snapshot generation that belongs to the backward differential group in terms of acquisition time of the snapshot generation.

3. The storage system according to claim 1, wherein the controller is configured to maintain former data that exists as backward differential data in the base volume as backward differential data, by copying the former data to the one or more backward differential data pools and writing forward differential data from the one or more forward differential data pools to the base volume.

4. The storage system according to claim 1, wherein the storage controller comprises a difference conversion processing unit that converts the forward differential data for each snapshot generation that belongs to the forward differential group to backward differential data in response to an amount of data stored in the one or more forward differential data pools exceeding a threshold set based on a memory capacity.

5. The storage system according to claim 1, wherein the storage controller comprises a difference conversion processing unit that converts the forward differential data for each snapshot generation that belongs to the forward differential group to backward differential data in response to a ratio of read accesses to write accesses for the storage device reaching a predetermined value.

6. The storage system according to claim 1, wherein the storage controller comprises a difference conversion processing unit that converts the forward differential data for each snapshot generation that belongs to the forward differential group to the backward differential data in response to an instruction from a management terminal.

7. The storage system according to claim 1, wherein the storage controller, upon first acquiring a snapshot generation with respect to an original logical unit where original data exists, selects, in accordance with an instruction from a management terminal connected to the storage controller, either of the forward differential method or the backward differential method for managing the snapshot generation and the original logical unit.

8. A method for controlling a storage system that comprises a storage device that stores data and a storage controller having the storage device as an access target, the storage controller including a logical unit that is associated with the data stored in the storage device, the logical unit including a plurality of snapshot generations, the method comprising:
using the storage controller to manage, when updating data stored in the storage device, the plurality of snapshot generations using a forward differential method in which each new data is written in an area that is different from an area in which corresponding former data was stored and a backward differential method in which each new data is written after corresponding former data is copied to a different area such that each snapshot generation included in the plurality of snapshot generations belongs to one of a forward differential group managed using the forward differential method and a backward differential group managed using the backward differential method;
maintaining information indicating whether each of the plurality of snapshot generations is an initial production generation for the plurality of snapshot generations, indicating whether each of the plurality of snapshot generations is managed using the forward differential method or the backward differential method, and indicating a corresponding relationship between the initial production generation and each of the other snapshot generations of the plurality of snapshot generations,
selecting, in response to receiving a read command, a method for determining a read destination address based on whether the snapshot generation targeted by the read command is managed using the forward differential method or the backward differential method;
selecting, in response to receiving a write command, a method for determining a write destination address based on whether the snapshot generation targeted by the write command is managed using the forward differential method or the backward differential method and further based on whether the snapshot generation targeted by the write command is the initial production generation for the plurality of snapshot generation wherein the snapshot generation targeted by the write command is managed using the backward differential method;
storing data that is commonly used between the forward differential group and the backward differential group in a base volume such that the base volume is shared by the forward differential group and the backward differential group;

storing difference data in comparison with the data of the base volume that belongs to the forward differential group in one or more forward differential data pools; and storing difference data in comparison with the data of the base volume that belongs to the backward differential group in one or more backward differential data pools.

* * * * *